United States Patent [19]

Dumas

[11] 3,771,024

[45] Nov. 6, 1973

[54] MULTIPLIER ASSEMBLY WITH AIR AND MATERIAL DIELECTRIC BARRIERS

[75] Inventor: Christ J. Dumas, Forest View, Ill.

[73] Assignee: American Plasticraft Company, Chicago, Ill.

[22] Filed: Sept. 5, 1972

[21] Appl. No.: 286,237

[52] U.S. Cl. .............. 317/100, 317/120, 174/52 PE

[51] Int. Cl. .............................................. H05k 7/20

[58] Field of Search .................. 317/99, 101 R, 100, 317/120, 256; 174/52 PE; 338/775, 333

[56] References Cited

UNITED STATES PATENTS

| | | | |
|---|---|---|---|
| 3,614,539 | 10/1971 | Hallenbeck | 317/101 R |
| 3,317,796 | 5/1967 | Thompson | 174/52 PE |
| 3,566,192 | 2/1971 | Stump, Jr. | 174/52 PE |
| 2,963,577 | 12/1960 | Errichiello | 317/101 R |

*Primary Examiner*—Robert K. Schaefer
*Assistant Examiner*—Gerald P. Tolin
*Attorney*—Leo J. Aubel et al.

[57] ABSTRACT

An electronic multiplier assembly for high voltage application which provides improved dielectric and thermal characteristics.

8 Claims, 4 Drawing Figures

MULTIPLIER ASSEMBLY WITH AIR AND MATERIAL DIELECTRIC BARRIERS

BACKGROUND OF THE INVENTION

In electronic assemblies such as associated with television picture tubes which use high voltage components packaged in relatively small assemblies, it is necessary to minimize corona discharge and to prevent the discharge of high voltages from the components to a point or points of lower potential. The corona discharge for instance, can cause damage to the components, and may also affect the quality of the picture tube.

Accordingly, it is a principal object of the present invention to provide an improved construction for housing high voltage assembly which provides improved dielectric separation between the regions of voltage differential in the assembly to thereby minimize and prevent corona and high voltage discharge.

It is another object of the present invention to provide an assembly construction which is compact and yet provides improved dielectric and thermal separation between the components.

The foregoing and other features and advantages of the invention will be apparent from the following more particular description of preferred embodiments of the invention as illustrated in the accompanying drawings wherein like reference characters refer to like elements throughout and wherein:

DESCRIPTION OF THE INVENTION

Figures 1, 3:
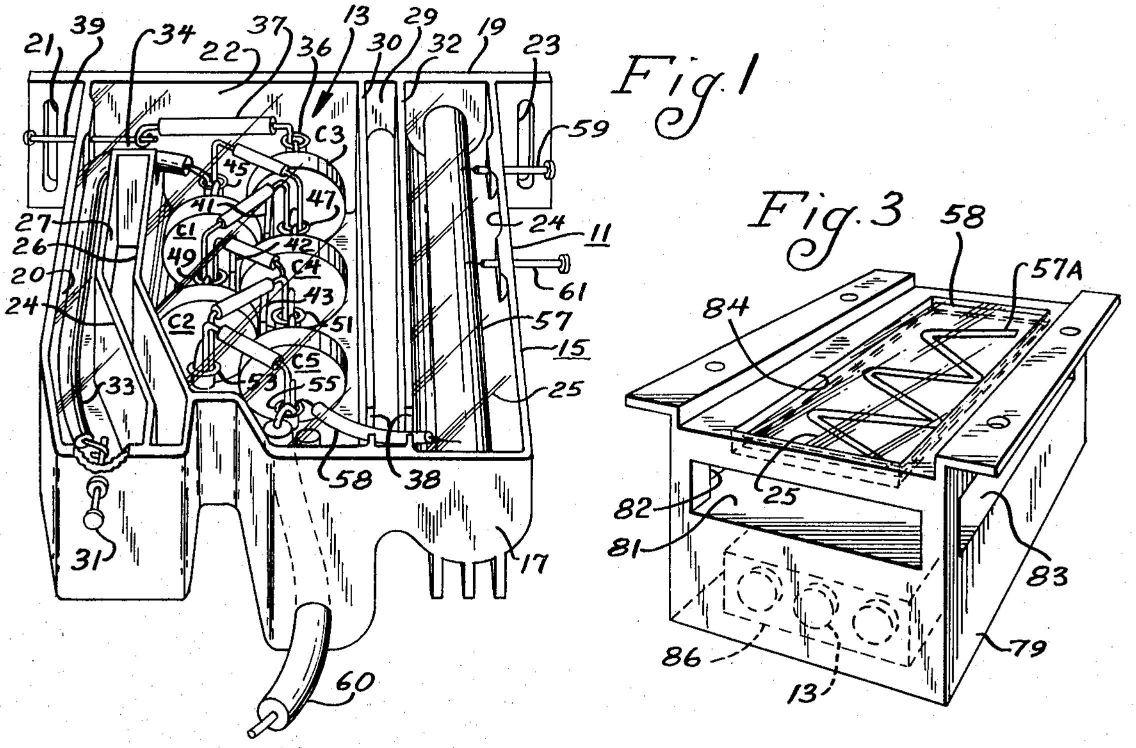
FIG. 1 is an isometric view of the assembly in accordance with the invention.
FIG. 3 is another embodiment of the inventive structure.

Refer to FIG. 1 which shows the inventive apparatus comprising in combination a multiplier and bleeder assembly with improved dielectric. The housing or case 15 for the multiplier assembly 13 in accordance with the invention may be formed of polypropylene or other suitable plastic. It should be understood at the outset that the invention is applicable generally to various types of multi-lattice networks including multiplier assemblies such as voltage doublers, triplers.

A housing or case 15 for the apparatus is U-shaped with a closed end 17 and a mounting base 19 closing the opposite end of the case. Mounting base 19 includes mounting slots 21 and 23. The upper side of the housing 15 as shown in FIG. 1 is open, and after assembly of the electronic components in the housing, the housing is filled or potted with a suitable encapsulation compound indicated as at 25.

As best seen in FIG. 1, the housing 15 is formed to have three separate discreet compartments 20, 22 and 24 which extend the length of the housing and which receive respective components as will be explained.

An input terminal pin 31 couples an input voltage through an input lead 33 mounted in compartment 20 to the electronic component of the multiplier assembly 13.

Importantly, compartment 20 is separated from the adjacent compartment 22 by spaced dielectric barriers 26 and 28 and an included air dielectric space 27. Dielectric barriers 26 and 28 thus define the elongated opening or spacing which provides an air dielectric space 27. A passage or opening 34 is formed in barriers 26 and 28 at a point adjacent the mounting base 19 to permit the input lead 33 to be passed therethrough to connect to an electronic terminal post 45 in compartment 22.

Compartment 22, the center compartment, contains capacitors C1–C5 and diodes D1–D5 which comprise a well known voltage tripler and which are electronically connected as shown in FIG. 3.

Figure 4:
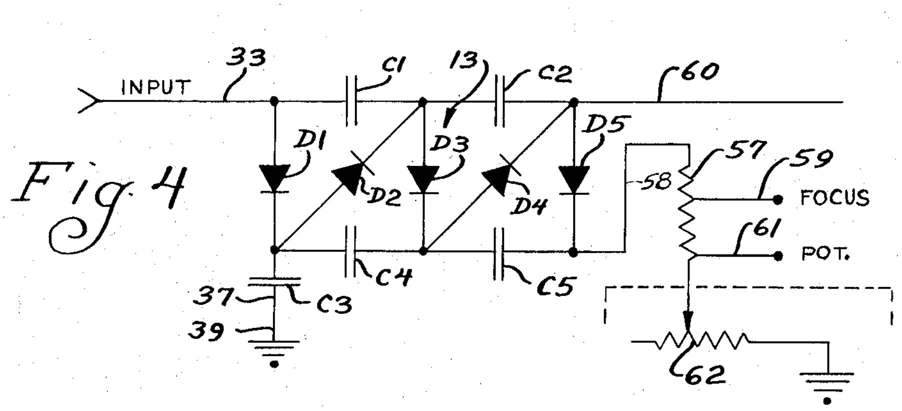
FIG. 4 is a schematic diagram of a circuit such as used in the present invention.

The electrical and electronic components and the circuit connections of FIG. 4 are well known in the art and do not, per se, comprise a part of this invention, hence, they need to be explained only briefly. The reference characters in FIG. 3 refer to points on the electrical circuitry corresponding to similar physical construction shown in FIG. 1.

The capacitors C1 and C2 function as AC coupling capacitors and also serve to store a DC voltage component, as is known in the art.

Capacitors C3, C4 and C5 function as the voltage adding capacitors. One terminal of capacitor C3 is connected to terminal post 36 and hence, through electrical lead 37 to ground terminal pin 39.

Mounting and positioning plates 41 and 42 and 43 provide means for positioing the capacitors C1–C5 in interleaved and staggered relation. Terminal posts 45, 47, 49, 51, 53 and 55 are positioned at the ends of, and intermediate, capacitors C1–C5 to facilitate the electronic connections between the capacitors C1–C5 and the diodes D1–D5. Diodes D1–D5 are positioned in superposed, angled and juxtaposition relation to capacitors C1–C5.

A focusing resistor 57 is positioned in compartment 24 and extends substantially the full length of the compartment. Compartment 24 is separated from the intermediate compartment 22 by spaced dielectric barriers 30 and 32 and an included air dielectric space 29. The dielectric barriers 30 and 32 thus define an elongated opening or spacing which provides an air dielectric 29. A passage or opening 38 in barriers 30 and 32 permit a lead to be passed therethrough to connect a focusing resistor 57.

An electronical connection is made from post 55 through lead 58 to one end or terminal of resistor 57. Post 55 also connects to the high voltage lead 60. The focusing resistor 57 may be a potentiometer or a multitap resistor as shown in FIG. 1 wherein the resistor 57 provides a focusing voltage output from tap 59 and a potentiometer output from tap 61.

The other end or terminal of resistor 57 is connected to a trimmer or focus control resistor 62 which is mounted externally of the housing as indicated by the dotted line adjacent resistor 62 in FIG. 4.

Focusing resistor 57 may be of any suitable shape such as an elongated circular rod, a flat plate or a rectangular rod, as will be discussed.

Dielectric barriers 24, 26, 30, 32 may be positioned in housing 15; or, the barriers may be formed as an integral part of housing 15 to provide an air dielectric barrier 25 and 29 between the compartments 20 and 22 and between compartments 22 and 24 respectively.

Note that the input lead 33 in compartment 20 is separated from capacitor C1–C5 and diodes D1–D5 in compartment 22 by a dielectric barrier 24, an air dielectric and a second dielectric barrier 26. Likewise, the capacitor C1–C5 and diodes D1–D5 are separated from the focusing resistor 57 by the dielectric barrier 30, air dielectric 29, and by the second dielectric barrier 32.

After the components are positioned in the housing 15, as shown in FIG. 1, with the electrical connections properly made, compartments 20, 22 and 24 of case 15 are filled with encapsulation or potting compound 25 such that components are encapsulated, potted or embedded in the casing 15, in the position indicated.

Note that there is a substantial air dielectric spacing formed betweeen each of the compartments.

The material used as the encapsulation compound is of a different material than the dielectric barrier.

An important concept of the invention is that the dielectric barriers 24, 26, 30 and 32 are of a material which is different from the encapsulation compound, and further that the air dielectric has different dielectric characteristics than either the dielectric barrier or the encapsulating compound. The foregoing provides different dielectric impedance to corona breakdown and accordingly, provides improved corona voltage dissipation characteristics, to thereby inhibit the initiation, and tend to prevent continuation of corona discharge.

The voltage input to the assembly 13 generally a low impedance, high voltage pulse which makes the components highly susceptible to the initiation of a corona discharge if the dielectric separation and spacing is not proper. Therefore, barriers 24 and 26, and the air spacing 27 are provided to separate the input lead 33 from the rest of the components.

As mentioned above, the barriers 24, 26, 30 and 32 are of a material different from the encapsulating compound and have a different dielectric constant then the encapsulating compound 25, and hence, exhibit different corona breakdown characteristics.

A further advantage is that the thermal insulation characteristics of the assembly 13 are considerably enhanced by the additional separation provided by the air dielectric spaces 27 and 29; and, also by providing opening which enhance air circulation and hence cooling by convection.

Figure 2:
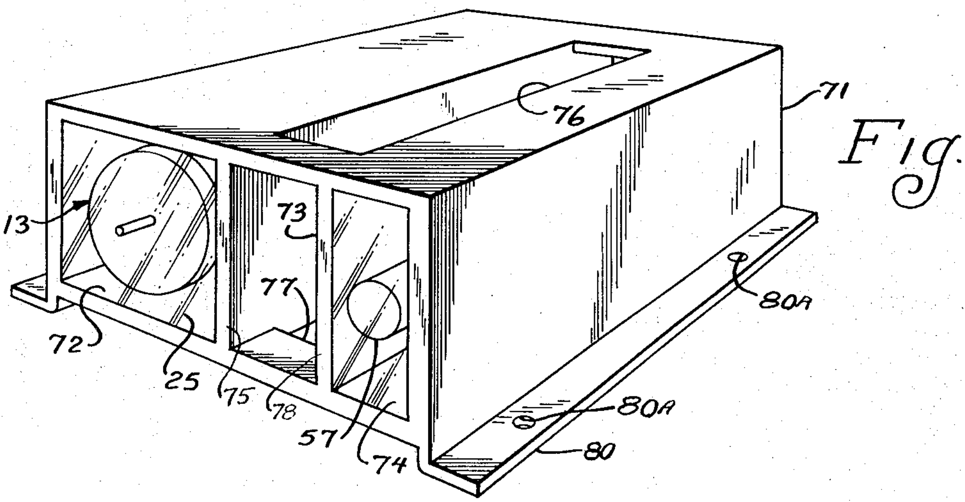
FIG. 2 is a second embodiment of the invention.

A second modification of the invention is shown in FIG. 2 which comprises a housing 71 having three compartments 72, 73 and 74 extending the full length of the housing 71 and open at both ends.

The multiplier assembly 13 is mounted in the first compartment 72, and the focusing resistor 57 is mounted in the third compartment 74. Housing or casing 71 includes suitable mounting flanges, generally indicated as 80, with suitable mounting holes 80A.

After the components are positioned in compartments 72 and 74, they are encapsulated in compound 25 similarly as in the structure of FIG. 1. No encapsulating material is inserted in compartment 73, such that the spacing or open compartment 73 is formed intermediate the compartments 72 and 74 and dielectric barriers or walls 75 and 78 separate compartment 73 from compartments 72 and 74, respectively. Openings 76 and 77 are formed at the bottom and at the top, as shown in FIG. 2, of compartment 73 to provide an open air-circulation pattern to promote thermal cooling.

A third embodiment of the invention is shown in FIG. 3 which includes inventive features similar to those of FIGS. 1 and 2. However, in FIG. 3 the housing or casing 79, which is also rectangular in shape, encapsulates the matrix or multiplier assembly 13 and a resistor 57A formed as a thick film on a flat rectangular plate, preferably a ceramic substrate 58. Functionally, resistor 57A is the same as resistor 57.

The housing 79 includes a pair of oppositely disposed recesses 84 and 86 with recess 84 on the top side of the housing 79 (as oriented in FIG. 3) and recess 86 on the bottom side of the housing. Recess 84 extends substantially the length of casing 79 and plate 58 (with resistor 57A) fits in the recess. In assembly, the plate 58 is placed in the recess 84 and encapsulated therein by the potting compound 25. Similarly, matrix assembly 13 is mounted in recess 86 on the opposite or bottom side of housing 79, and encapsulated therein.

A rectangular opening extends the length of the housing 79 and is open at either end to form an air dielectric spacing 81. Additionally, openings 83 and 85 at either side of the housing 79 communicate with spacing 81. Thus resistor 57A is positioned to be separated from the multiplier assembly 13 by the air space 81 as well as by the dielectric barriers forming the top and bottom boundries of opening 81. Note, the air circulation paths extend from front to the rear of the housing 79 and also from the one side to the opposite side of the housing. As in the other embodiment, the spacing 81 provides an air dielectric between resistor 57A and multiplier assembly 13 as well as a means of improving the thermal dissipation characteristics of the device.

In each of the embodiments as shown in FIGS. 1, 2 and 3, the focusing resistor is separated from the matrix assembly by a combination air dielectric barrier and a material dielectric barrier. The foregoing tends to hold the voltage gradient between the various sub-assembly parts substantially the same to improve corona breakdown characteristics as well as to provide improved voltage regulation.

Also, the heat from the focusing resistor will tend to flow outwardly from the encapsulating compound and through the air dielectric spacing to the ambient rather than into the multiplier assembly.

The focusing resistor also acts as a dampening resistor to corona discharge and thereby minimizes the corona on the output line between the multiplier assembly 13 and a picture tube or other portions of high voltage exterior to multiplier assembly.

Note, of course, that the basic shape and thickness of the air and material barriers may vary depending upon the dielectric insulation parameters required between the multiplier assembly 13 and the focusing resistor.

While the invention has been particularly shown and described with reference to preferred embodiments thereof, it will be understood by those skilled in the art that various changes in form and details may be made therein without departing from the spirit and scope of the invention.

I claim:

1. An assembly of electronic components including a voltage multiplier connected to an impedance means comprising, a housing containing said components, air dielectric barrier means, material dielectric barrier means, said air dielectric barrier means having different dielectric characteristics than said material barrier means, said air and material dielectric barriers separating said voltage multiplier and said impelance means, and encapsulation means encapsulating said components, said encapsulation means having different dielectric characteristics than said air and material dielectric barrier means, said components and said barrier means providing voltage gradients which are substantially the same between the various components to provide improved corona breakdown characteristics for the assembly and whereby said air dielectric barrier means provide improved thermal characteristics for the assembly.

2. An apparatus as in claim 1 further comprising a first electrical conductor connecting to said multiplier assembly, an air dielectric barrier and a material barrier separating the major portion of said conductor from said assembly, an impedance element comprising an output means for said assembly, an air dielectric barrier and a material barrier means separating said impedance element from said assembly.

3. An apparatus as in claim 1 wherein said impedance means comprises a thick film resistor formed in a relatively flat plane.

4. An apparatus as in claim 1 wherein said housing is divided into three compartments with each compartment being separated from the adjacent compartment by a first material barrier, an air dielectric barrier, and a second material barrier.

5. An apparatus as in claim 4 wherein said compartments are filled with potting compounds.

6. An apparatus as in claim 1 comprising a first compartment receiving the multiplier assembly, and a second compartment receiving the impedance means, and an air spacing formed between said compartments as dielectric barrier and as a thermal barrier.

7. An apparatus as in claim 1 further including a high voltage lead, said first compartment is containing the high voltage lead, said second compartment is containing the multiplier assembly, and said third compartment containing the said impedance means.

8. An apparatus as in claim 3 wherein said apparatus includes a first compartment receiving the resistor and a second compartment receiving the electronic components, and said two compartments are filled with encapsulating compound.

* * * * *